(12) United States Patent
Yang et al.

(10) Patent No.: US 8,956,448 B2
(45) Date of Patent: Feb. 17, 2015

(54) ENVIRONMENTALLY-FRIENDLY EXHAUST DEVICE

(71) Applicants: Chun-Rei Yang, Taichung (TW); Shih-Wei Lai, Taichung (TW)

(72) Inventors: Chun-Rei Yang, Taichung (TW); Shih-Wei Lai, Taichung (TW)

(*) Notice: Subject to any disclaimer, the term of this patent is extended or adjusted under 35 U.S.C. 154(b) by 284 days.

(21) Appl. No.: 13/708,998

(22) Filed: Dec. 9, 2012

(65) Prior Publication Data
US 2014/0157991 A1    Jun. 12, 2014

(51) Int. Cl.
*B01D 47/00* (2006.01)
*B01D 47/06* (2006.01)

(52) U.S. Cl.
CPC .................................. *B01D 47/06* (2013.01)
USPC ................... 96/271; 96/306; 96/307; 96/311; 96/313; 96/355; 96/359; 96/361

(58) Field of Classification Search
USPC .............. 96/306, 301, 311, 173, 7; 95/35, 34, 95/287; 55/476, 474, 492
See application file for complete search history.

(56) References Cited

U.S. PATENT DOCUMENTS

| | | | | |
|---|---|---|---|---|
| 2,575,359 A | * | 11/1951 | Ortgies | 96/237 |
| 3,847,571 A | * | 11/1974 | Cole, Jr. | 95/150 |
| 2006/0086253 A1 | * | 4/2006 | Gaur et al. | 96/321 |

\* cited by examiner

*Primary Examiner* — Duane Smith
*Assistant Examiner* — Phillip Shao
(74) *Attorney, Agent, or Firm* — Che-Yang Chen; Law Office of Michael Chen (57) ABSTRACT

An environmentally-friendly exhaust device comprises an outer tank. An inner pipe is disposed inside the outer tank. An air propeller is disposed below the inner pipe inside the outer tank. An upper guiding plate and a lower guiding plate are disposed on a surface of the inner pipe for connecting with the outer tank. Thereby, air, oil mist and water are entered between the outer tank and the inner pipe; and are guided to the air propeller below through the upper and the lower guiding plates; and then are exhausted through the inner pipe upwardly. The purification of oil mist is processed integrally for enhancing the efficiency of exhaust and achieving the environmentally-friendly effects. Multiple layers of filter screens provided for carrying out multiple filtering are economically effective and can further enhance the environmentally-friendly effects.

20 Claims, 13 Drawing Sheets

ENVIRONMENTALLY-FRIENDLY EXHAUST DEVICE

BACKGROUND OF THE INVENTION

1. Field of Invention

The present invention relates to an environmentally-friendly exhaust device and more particularly to a filter screen assembly having multiple layers of filter screens for carrying out multiple filtering. An integrated process is employed for enhancing the efficiency of exhaust filtering or purification and achieving the environmentally-friendly effects.

2. Related Art

People nowadays frequently emphasize environmentally-friendly awareness, and exhaust from various sources contains a great amount of poisonous substances such as carbon monoxide, hydrocarbon and oxysulfide, etc.

Conventional exhaust devices employ sponge to absorb and filter the oil mist or vapor during the process of oil mist. Such method requires changing of the sponge very often, and it is even more troublesome to change the sponge absorbed with oil. Furthermore, the replacement process costs manpower and time. The need for replacing the sponge very often will also increase the cost and therefore the conventional devices and method are not economically effective.

Additionally, conventional method for separating oil mist from air is performed by filling the oil mist into a waste water pool and detergent is added into the waste water pool. Then, the waste water pool is stirred over and over again to mix the detergent with oil. The oil will dissolve in the water. Such mixing method requires very high costs and is also not economically effective.

An environmentally-friendly exhaust device is provided by the present invention for improving the above-mentioned drawback of economical ineffectiveness of the conventional exhaust filtering method and purification method.

SUMMARY OF THE INVENTION

The problems needed to be solved are the high costs and economical ineffectiveness of the conventional exhaust filtering method and purification method of oil mist by using, for examples, sponge to absorb the oil mist and waste water pool to purify the oil. The need for changing the sponge very often costs manpower and time. Stirring and mixing in the waste water pool requires very high costs. Therefore, both methods are economically ineffective.

A means for solving the above-mentioned problems including to provide an environmentally-friendly exhaust device by the present invention, the environmentally-friendly exhaust device comprising:

an outer tank with a plurality of supporting legs being disposed on a bottom circumference of the outer tank to enable the outer tank to stand, a fixing block being disposed on a central location inside the outer tank, an upper connecting hole being disposed on a central location of a top side, a lower connecting hole being disposed on a central location of a bottom side, the upper connecting hole and the lower connecting hole being connected, a guiding groove portion being disposed on a bottom of the fixing block, a stopping plate being disposed on two sides of the fixing block respectively, a pivot being disposed in the upper connecting hole of the fixing block, a middle section of the pivot being formed with a relatively larger diameter for the pivot to press against inside the upper connecting hole, an axial hole being penetrated through a central location of the pivot, an axial rod being disposed in the axial hole, a bottom end of the axial rod being formed with a relatively smaller diameter, thereby the bottom end of the axial rod pressing against the lower connecting hole after penetrating through the axial hole, a top end of the axial rod penetrating through the axial hole, thereby a locking piece being sleeved on the top end of the axial rod, the locking piece being fixed on a top side of the pivot, a plurality of rotational rods being disposed radially on a circumference of the locking piece, an air propeller being disposed on an end portion of each of the rotational rods, a plurality of inclined guiding grooves in spiral grooved shape being disposed on the circumference of the locking piece, each of the guiding grooves extending downwardly to a bottom end of the pivot, an oil outlet being connected to a lower section of the outer tank, a water outlet being connected to the outer tank below the oil outlet, an oil outlet switch being disposed on the oil outlet, a water outlet switch being disposed on the water outlet, a water outlet pipe being connected to a bottom central location of the outer tank, a first water outlet switch being disposed on the water outlet pipe for controlling the water outlet pipe to let out water;

an inner pipe disposed inside the outer tank, a fixing frame being disposed on a bottom end inside the inner pipe, the fixing frame being disposed on the top end of the axial rod for positioning the inner pipe, a filter screen assembly being disposed inside the inner pipe and above the fixing frame, the filter screen assembly comprising multiple layers of separated arc-shaped screens, a plurality of connecting rods being disposed on an inner circumference of each of the arc-shaped screens for connecting the arc-shaped screens as one body, an arc-shaped part of each of the arc-shaped screens facing upwardly or facing downwardly, each of the connecting rods extending upwardly and bending to connect with each other for convenience of holding, a circular stopping plate being disposed on an outer circumference of an upper section of the inner pipe, a circumference of the circular stopping plate being fixedly connected to an inner circumference of the outer tank, an upper guiding plate being connected to a lower edge of the circular stopping plate on the inner pipe, the upper guiding plate being spirally surrounding on the inner pipe and fixedly connected to an inner surface of the outer tank, a lower guiding plate being disposed below the upper guiding plate, the lower guiding plate being fixedly connected to the inner surface of the outer tank, a compartment being formed between the lower guiding plate and the upper guiding plate for spirally surrounding on the inner pipe, a double spiral with a helix intersecting shape being formed by the upper guiding plate and the lower guiding plate;

a water spray device comprising a tubular portion, an end of the tubular portion being connected to the outer tank and the tubular portion being disposed between the upper guiding plate and the lower guiding plate, another end of the tubular portion being connected to an air inlet pipe, the air inlet pipe being used for transporting air and oil mist, the air and oil mist inside the air inlet pipe being guided between the lower guiding plate and the upper guiding plate and flowed downwardly to the bottom of the outer tank, a mist sprayer being disposed inside the tubular portion for spraying mist toward the outer tank, the mist sprayer penetrating through the tubular portion upwardly for connecting with a mist spray elastic switch, the mist spray elastic switch being used for controlling the mist sprayer to spray mist, the mist spray elastic switch being connected with a water controlling element for controlling inlet and outlet of a water source, an actuating portion being pivotally disposed on an upper circumference of the tubular portion, the actuating portion being disposed between the mist spray elastic switch and the outer tank, the actuating portion being pressed toward the mist spray elastic switch, the 
actuating portion being connected to an actuating plate disposed inside the tubular portion, the actuating plate being blown and moved by a wind power inside the air inlet pipe for pressing the actuating portion toward the mist spray elastic switch and causing the mist sprayer starting to spray mist, the mist spray elastic switch being automatically restored and stopped to spray mist after the wind power disappearing;

a lower cover comprising a lower body with a concave arc-shaped top, a lower sleeve portion being disposed on a central location of a bottom of the lower body, the lower sleeve portion being sleeved on the outer circumference of the inner pipe;

an upper cover comprising an upper body with a concave arc-shaped bottom, an upper sleeve portion being disposed at a central location of a top of the upper body, a circumference of the upper body being connected to a top end edge of the outer tank; and an oil and water separating tank connected to the oil outlet and the water outlet, a water discharge portion being disposed on a lower section of the oil and water separating tank, an oil storage pipe being connected on the oil and water separating tank, an oil discharge portion being disposed on the oil storage pipe.

According to the above-mentioned design, the fixing block of the present invention is in a reducing staircase shape from bottom to top.

According to the above-mentioned design, a quantity of the supporting legs of the present invention can be three and the supporting legs are disposed equivalently.

According to the above-mentioned design, the bottom inside the outer tank is formed in an arc shape with a convex side facing downwardly. A plurality of concave positioning portions is disposed on the bottom of the outer tank. A plurality of convex fixing portions is disposed on the bottom of the fixing block for positioning the concave positioning portions.

According to the above-mentioned design, a quantity of the rotational rods of the present invention can be six.

According to the above-mentioned design, a quantity of the guiding grooves of the present invention can be three.

According to the above-mentioned design, a screwing element is disposed on the bottom end of the axial rod of the present invention.

According to the above-mentioned design, the screwing element of the present invention can be a screw.

According to the above-mentioned design, a connection pipe is connected on a side of the oil and water separating tank of the present invention. A height of the oil and water of the oil and water separating tank can be known through the connection pipe.

According to the above-mentioned design, the oil storage pipe of the present invention is transparent.

According to the above-mentioned design, the actuating plate of the present invention is in a semilunar shape.

According to the above-mentioned design, the water outlet pipe of the present invention extends externally. A water outlet connection pipe penetrating upwardly into the bottom of the outer tank is disposed on the extension portion of the water outlet pipe. The water outlet connection pipe is controlled to let out water by a second water outlet switch.

According to the above-mentioned design, the fixing frame of the present invention can be disposed on a plurality of fixing rods at the central location of the inner pipe and is connected to an inner surface of the inner pipe.

According to the above-mentioned design, a quantity of the arc-shaped screens of the present invention can be four.

According to the above-mentioned design, the environmentally-friendly exhaust device of the present invention further comprises an air sleeve. The air sleeve is disposed on an outer circumference of the upper sleeve portion of the upper cover. A fixed filter screen is disposed inside the air sleeve.

According to the above-mentioned design, a quantity of the connecting rods of the present invention can be three.

According to the above-mentioned design, a transparent portion is disposed on an outer surface of the outer tank of the present invention. An inner portion of the outer tank can be observed clearly externally.

According to the above-mentioned design, the transparent portion of the present invention can be a lens. An upper part of the lens is in an arc shape and a lower part of the lens is straight.

According to the above-mentioned design, a plurality of engaging elements is disposed on the circumference of the upper body of the present invention. Each of the engaging elements is engaged on the outer tank for positioning.

According to the above-mentioned design, a circular screen is downwardly disposed on an inner circumference of the upper sleeve portion of the present invention. A supporting portion is installed on a bottom of the circular screen. An oil pipe line is disposed on a side of the supporting portion. The oil pipe line extends between the outer tank and the inner pipe and penetrates downwardly through the lower body of the lower cover and the bottom of the outer tank. The oil pipe line is connected to the oil and water separating tank.

According to the above-mentioned design, a fixing element is penetrated through a bottom of each of the supporting legs of the present invention for fixing the supporting legs on a plane.

According to the above-mentioned design, the fixing element of the present invention can be a screw.

Comparing the effects of conventional techniques with the effects of the environmentally-friendly exhaust device provided by the present invention. The purification of oil mist of the present invention is processed integrally for enhancing the efficiency of exhaust and achieving the environmentally-friendly effects. Multiple layers of filter screens of the present invention provided for carrying out multiple filtering are economically effective and can further enhance the environmentally-friendly effects.

The present invention will become more fully understood by reference to the following detailed description thereof when read in conjunction with the attached drawings.

BRIEF DESCRIPTION OF THE DRAWINGS

FIG. 1 is a perspective view of an environmentally-friendly exhaust device of the present invention;

FIG. 2 is a sectional view of the environmentally-friendly exhaust device of the present invention;

FIG. 3 is an enlarged perspective view of a fixing block and an air propeller of the present invention;

FIG. 4 is an enlarged sectional view of a pivot and an axial rod of the present invention;

FIG. 5 is an enlarged perspective view of a water spray device of the present invention;

FIG. 6 is a sectional view of an actuating portion and an actuating plate of the present invention;

FIG. 7 is a sectional view of a circular screen of the present invention;

FIG. 8 is a perspective view of a filter screen assembly of the present invention;

FIG. 9 is a perspective view of a fixing frame on a bottom of an inner pipe of the present invention;

DETAILED DESCRIPTION OF THE INVENTION

Please refer to FIGS. 1 to 13. An environmentally-friendly exhaust device provided by the present invention mainly comprises an outer tank 10, an inner pipe 20, a water spray device 30, a lower cover 40, an upper cover 50, an air sleeve 60 and an oil and water separating tank 70.

A plurality of supporting legs 11 is disposed on a bottom circumference of the outer tank 10 to enable the outer tank 10 to stand. A quantity of the supporting legs 11 can be three and the supporting legs 11 are disposed equivalently. A fixing element 111 is penetrated through a bottom of each of the supporting legs 11 for fixing the supporting legs 11 on a plane. The fixing element 111 can be a screw. A transparent portion 101 is disposed on an outer surface of the outer tank 10. An inner portion of the outer tank 10 can be observed clearly externally. The transparent portion 101 can be a lens. An upper part of the lens is in an arc shape and a lower part of the lens is straight. The bottom inside the outer tank 10 is formed in an arc shape with a convex side facing downwardly. A plurality of concave positioning portions 102 is disposed on the bottom of the outer tank 10. A fixing block 12 is disposed on a central location inside the outer tank. The fixing block 12 is in a reducing staircase shape from bottom to top. An upper connecting hole 121 is disposed on a central location of a top side, and a lower connecting hole 122 is disposed on a central location of a bottom side. The upper connecting hole 121 and the lower connecting hole 122 are connected. A plurality of convex fixing portions 124 is disposed on the bottom of the fixing block 12 for positioning the concave positioning portions 102. A guiding groove portion 123 is disposed on a bottom of the fixing block 12. A stopping plate 125 is disposed on two sides of the fixing block 12 respectively. A pivot 13 is disposed in the upper connecting hole 121 of the fixing block 12. A middle section of the pivot 13 is formed with a relatively larger diameter for the pivot 13 to press against inside the upper connecting hole 121. An axial hole 131 is penetrated through a central location of the pivot 13. An axial rod 14 is disposed in the axial hole 131. A bottom end of the axial rod 14 is formed with a relatively smaller diameter; thereby the bottom end of the axial rod 14 is pressed against the lower connecting hole 122 after penetrating through the axial hole 131. A screwing element 141 is disposed on the bottom end of the axial rod 14. The screwing element 141 can be a screw. A top end of the axial rod 14 penetrates through the axial hole 131; thereby a locking piece 15 can be sleeved on the top end of the axial rod 14. The locking piece 15 is fixed on a top side of the pivot 13. A plurality of rotational rods 151 is disposed radially on a circumference of the locking piece 15. An air propeller 152 is disposed on an end portion of each of the rotational rods 151. A plurality of inclined guiding grooves 16 in spiral grooved shape is disposed on the circumference of the locking piece 15. Each of the guiding grooves 16 extends downwardly to a bottom end of the pivot 13. A quantity of the rotational rods 151 can be six. A quantity of the guiding grooves 16 can be three. An oil outlet 17 is connected to a lower section of the outer tank 10. A water outlet 18 is connected to the outer tank 10 below the oil outlet 17. An oil outlet switch 171 is disposed on the oil outlet 17. A water outlet switch 181 is disposed on the water outlet 18. A water outlet pipe 19 is connected to a bottom central location of the outer tank 10. A first water outlet switch 191 is disposed on the water outlet pipe 19 for controlling the water outlet pipe 19 to let out water. The water outlet pipe 19 extends externally. A water outlet connection pipe 192 penetrating upwardly into the bottom of the outer tank 10 is disposed on the extension portion of the water outlet pipe 19. The water outlet connection pipe 192 is controlled to let out water by a second water outlet switch 193.

The inner pipe 20 is disposed inside the outer tank 10. A fixing frame 21 is disposed on a bottom end inside the inner pipe 20. The fixing frame 21 can be disposed on a plurality of fixing rods at the central location of the inner pipe 20 and is connected to an inner surface of the inner pipe 20. A quantity of the fixing rods can be three and the fixing rods are disposed equivalently. The fixing frame 21 is disposed on the top end of the axial rod 14 for positioning the inner pipe 20. A filter screen assembly 23 is disposed inside the inner pipe 20 and above the fixing frame 21. The filter screen assembly 23 comprises multiple layers of separated arc-shaped screens 231. A quantity of the arc-shaped screens 231 can be four. A plurality of connecting rods 232 is disposed on an inner circumference of each of the arc-shaped screens 231 for connecting the arc-shaped screens 231 as one body. An arc-shaped part of each of the arc-shaped screens 231 faces upwardly or faces downwardly. A quantity of the connecting rods 232 can be three. Each of the connecting rods 232 extends upwardly and bends to connect with each other for convenience of holding. A circular stopping plate 24 is disposed on an outer circumference of an upper section of the inner pipe 20. A circumference of the circular stopping plate 24 is fixedly connected to an inner circumference of the outer tank 10. An upper guiding plate 25 is connected to a lower edge of the circular stopping plate 24 on the inner pipe 20. The upper guiding plate 25 is spirally surrounding on the inner pipe 20 and fixedly connected to an inner surface of the outer tank 10. A lower guiding plate 26 is disposed below the upper guiding plate 25. The lower guiding plate 26 is fixedly connected to the inner surface of the outer tank 10. A compartment is formed between the lower guiding plate 26 and the upper guiding plate 25 for spirally surrounding on the inner pipe 20. A double spiral with a helix intersecting shape is formed by the upper guiding plate 25 and the lower guiding plate 26.

The water spray device 30 comprises a tubular portion 31. An end of the tubular portion 31 is connected to the outer tank 10 and the tubular portion 31 is disposed between the upper guiding plate 25 and the lower guiding plate 26. Another end of the tubular portion 31 is connected to an air inlet pipe 32. The air inlet pipe 32 is used for transporting air and oil mist. The air and oil mist inside the air inlet pipe 32 is guided between the lower guiding plate 26 and the upper guiding plate 25 and flowed downwardly to the bottom of the outer tank 10. A mist sprayer 33 is disposed inside the tubular portion 31 for spraying mist toward the outer tank 10. The mist sprayer 33 penetrates through the tubular portion 31 upwardly for connecting with a mist spray elastic switch 34. The mist spray elastic switch 34 is used for controlling the mist sprayer 33 to spray mist. The mist spray elastic switch 34 is connected with a water controlling element 35 for controlling inlet and outlet of a water source. An actuating portion 36 is pivotally disposed on an upper circumference of the tubular portion 31. The actuating portion 36 is disposed between the mist spray elastic switch 34 and the outer tank 10. The actuating portion 36 can be pressed toward the mist spray elastic switch 34. The actuating portion 36 is connected to a semi-lunar shaped actuating plate 37 disposed inside the tubular portion 31. The actuating plate 37 is blown and moved by a wind power inside the air inlet pipe 32 for pressing the actuating portion 36 toward the mist spray elastic switch 34 and causing the mist sprayer 33 starting to spray mist. The mist spray elastic switch 34 is automatically restored and stopped to spray mist after the wind power disappears.

The lower cover 40 comprises a lower body 41 with a concave arc-shaped top. A lower sleeve portion 42 is disposed on a central location of a bottom of the lower body 41. The lower sleeve portion 42 is sleeved on the outer circumference of the inner pipe 20.

The upper cover 50 comprises an upper body 51 with a concave arc-shaped bottom. An upper sleeve portion 52 is disposed at a central location of a top of the upper body 51. A circumference of the upper body 51 is connected to a top end edge of the outer tank 10. A plurality of engaging elements 53 is disposed on the circumference of the upper body 51. Each of the engaging elements 53 is engaged on the outer tank 10 for positioning. A circular screen 54 is downwardly disposed on an inner circumference of the upper sleeve portion 53. A supporting portion 55 is installed on a bottom of the circular screen 54. An oil pipe line 56 is disposed on a side of the supporting portion 55. The oil pipe line 56 extends between the outer tank 10 and the inner pipe 20 and penetrates downwardly through the lower body 41 of the lower cover 40 and the bottom of the outer tank 10.

The air sleeve 60 is disposed on an outer circumference of the upper sleeve portion 52 of the upper cover 50. A fixed filter screen 61 is disposed inside the air sleeve 60.

The oil and water separating tank 70 is connected to the oil outlet 17, the water outlet 18 and the oil pipe line 56. A connection pipe 71 is connected on a side of the oil and water separating tank 70. A height of the oil and water of the oil and water separating tank 70 can be known through the connection pipe 71. A water discharge portion 72 is disposed on a lower section of the oil and water separating tank 70. A transparent oil storage pipe 73 is connected on the oil and water separating tank 70. An oil discharge portion 74 is disposed on the oil storage pipe 73.

Figure 1:
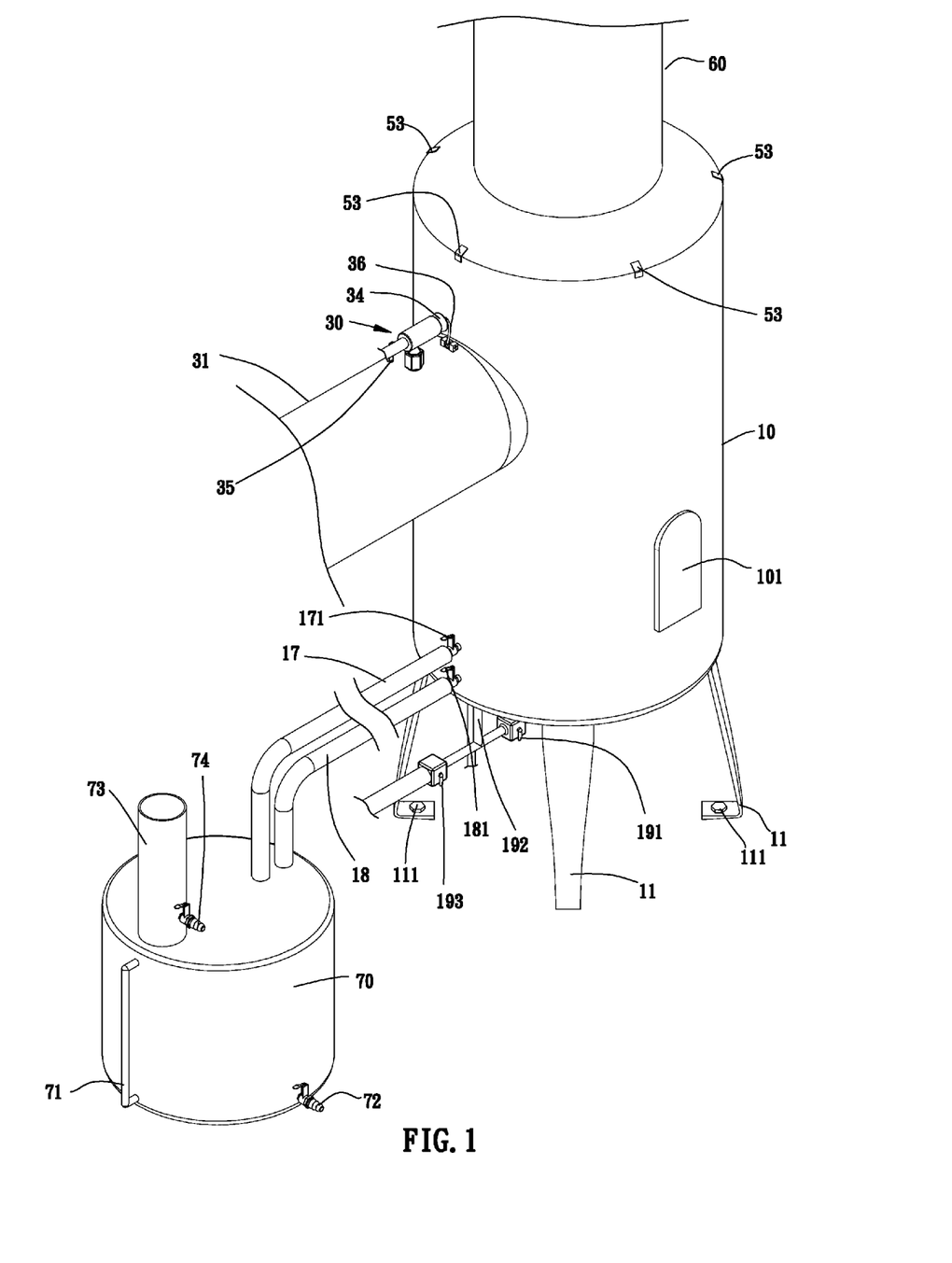
Figure 2:
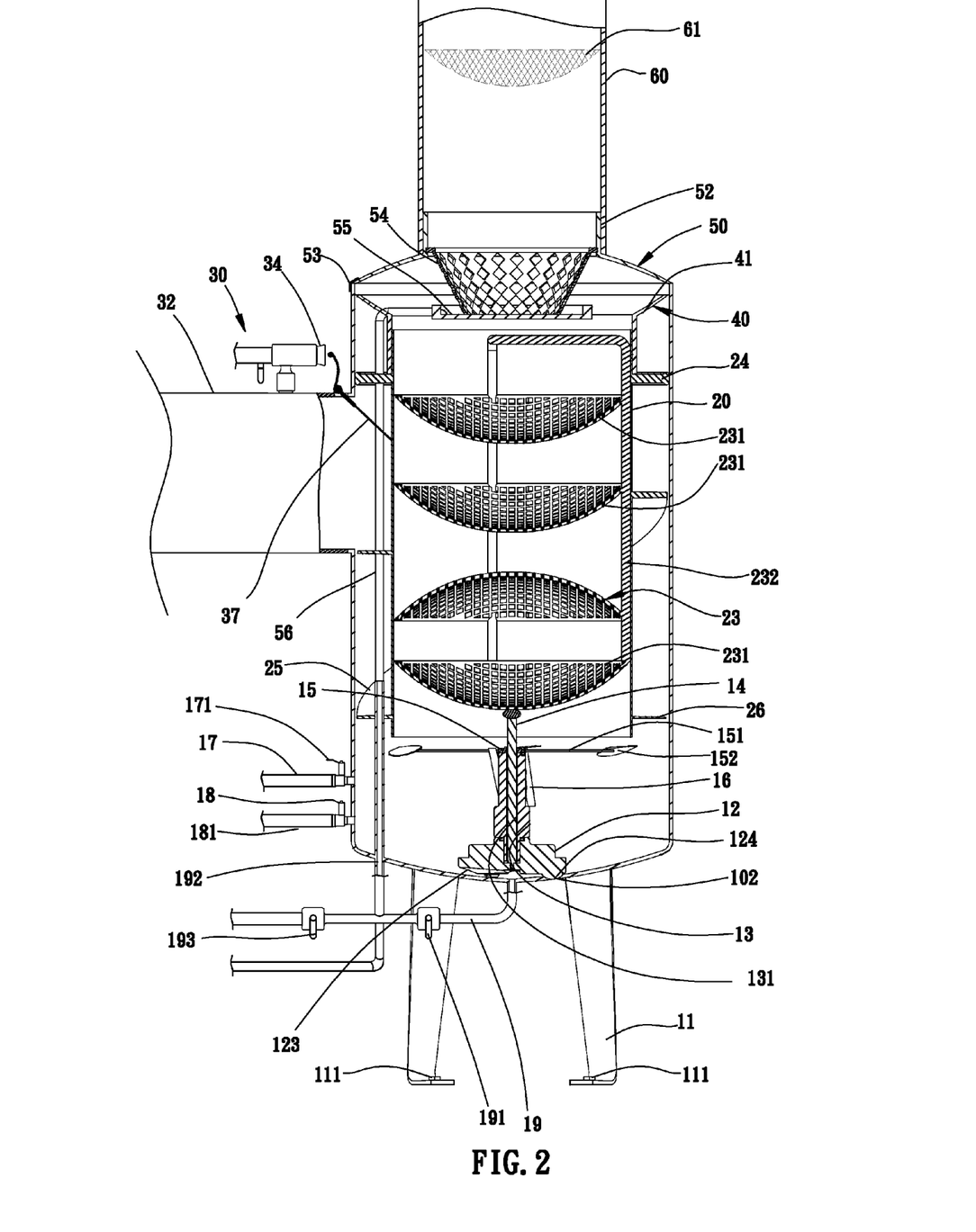
Figure 3:
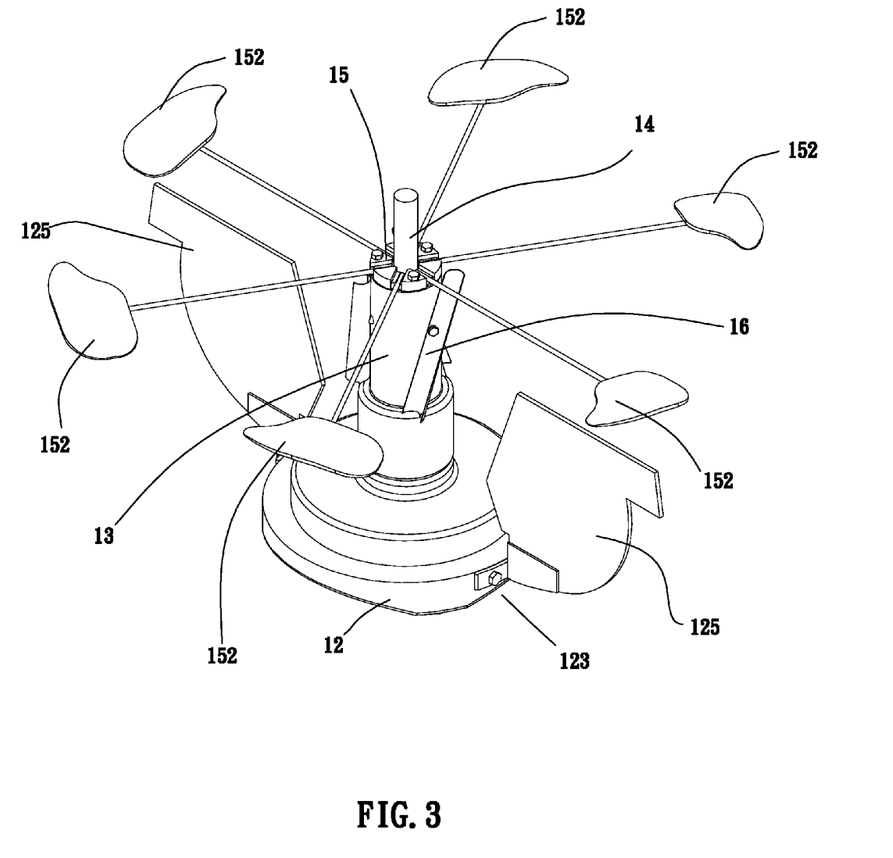
Figure 4:
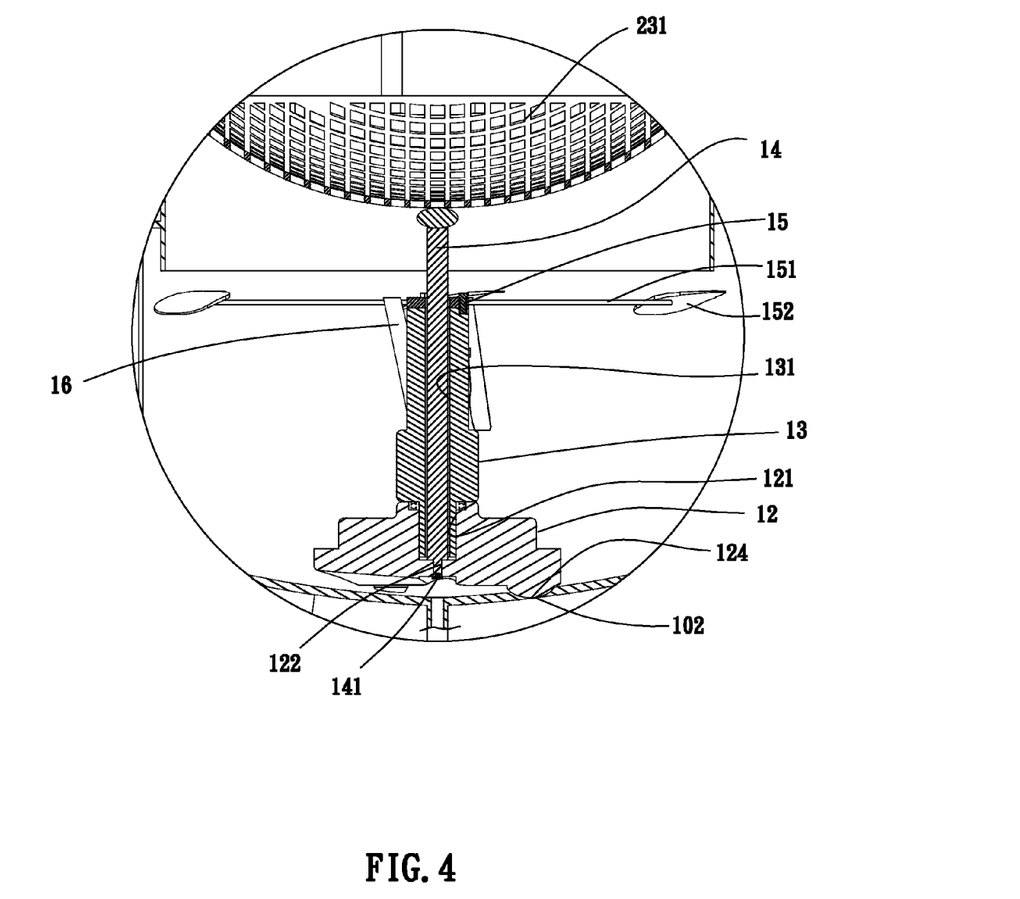
Figure 5:
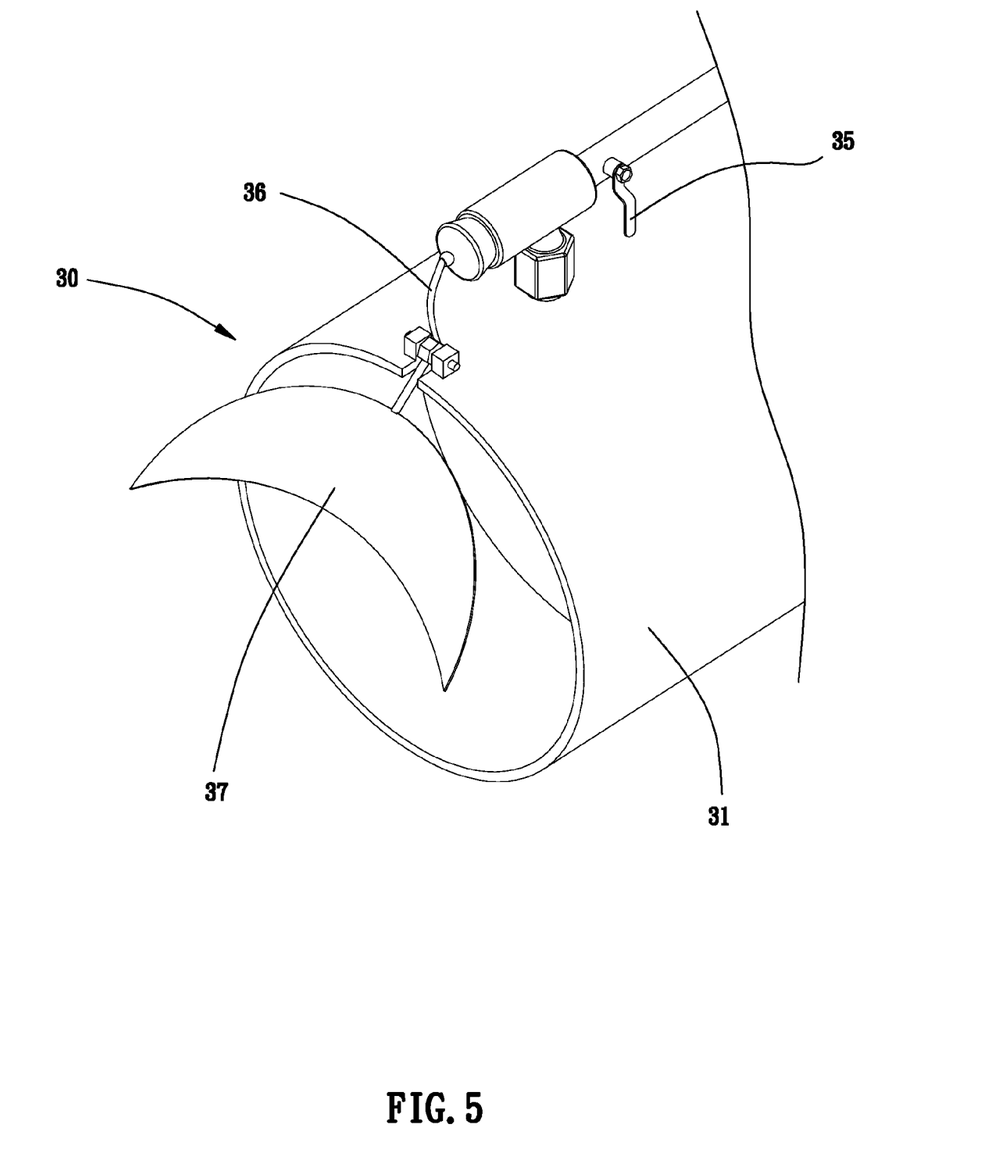
Figure 6:
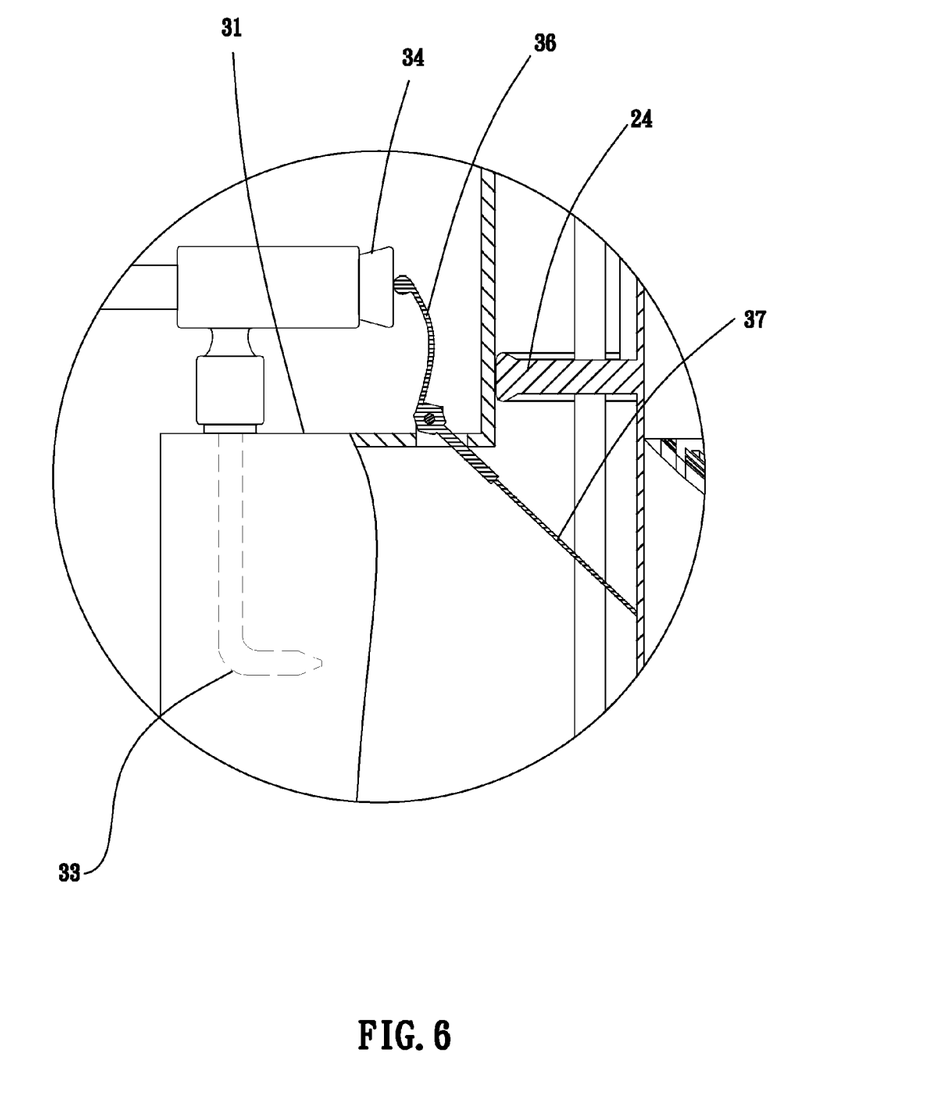
Figure 7:
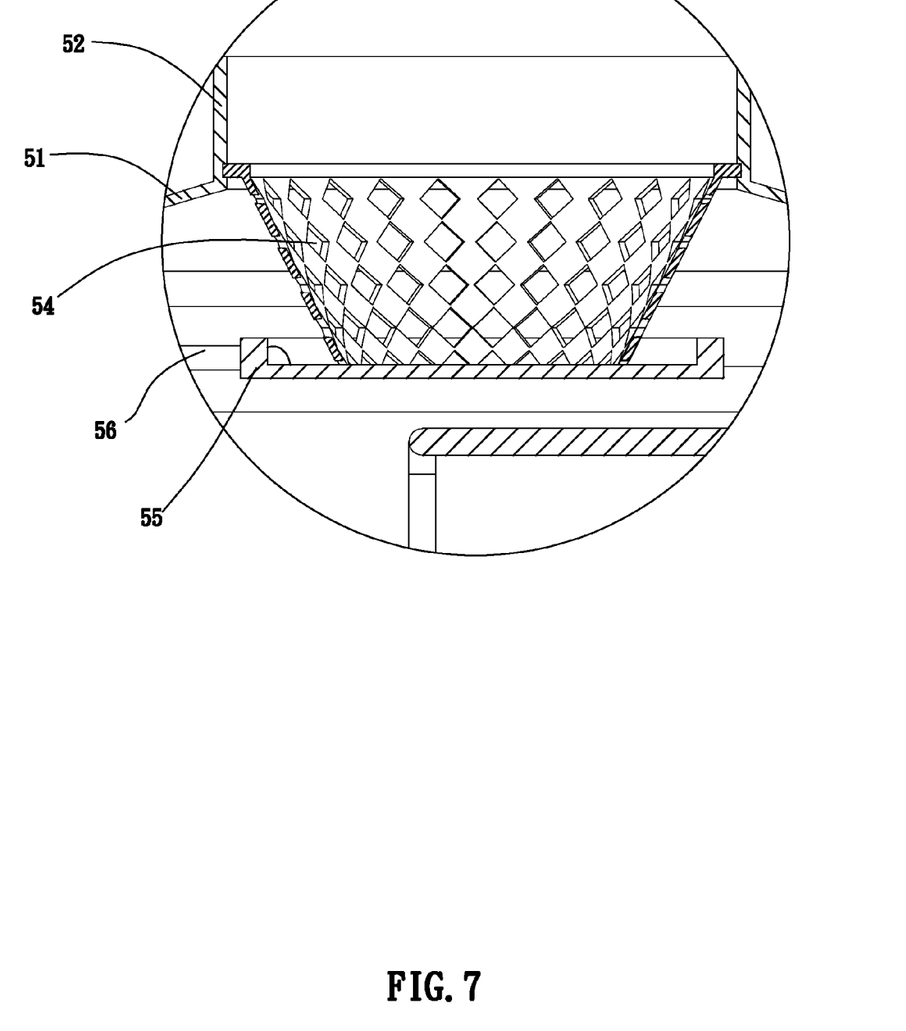
Figure 8:
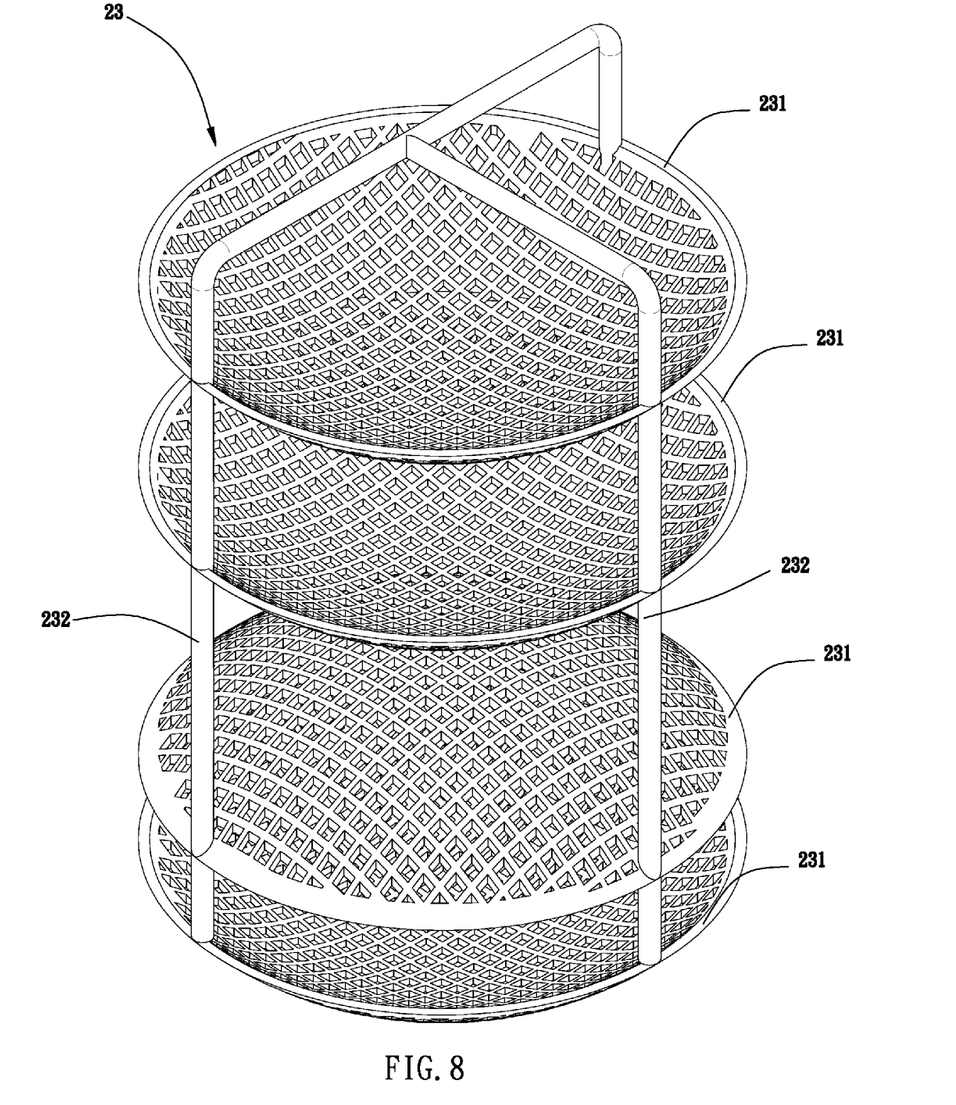
Figure 9:
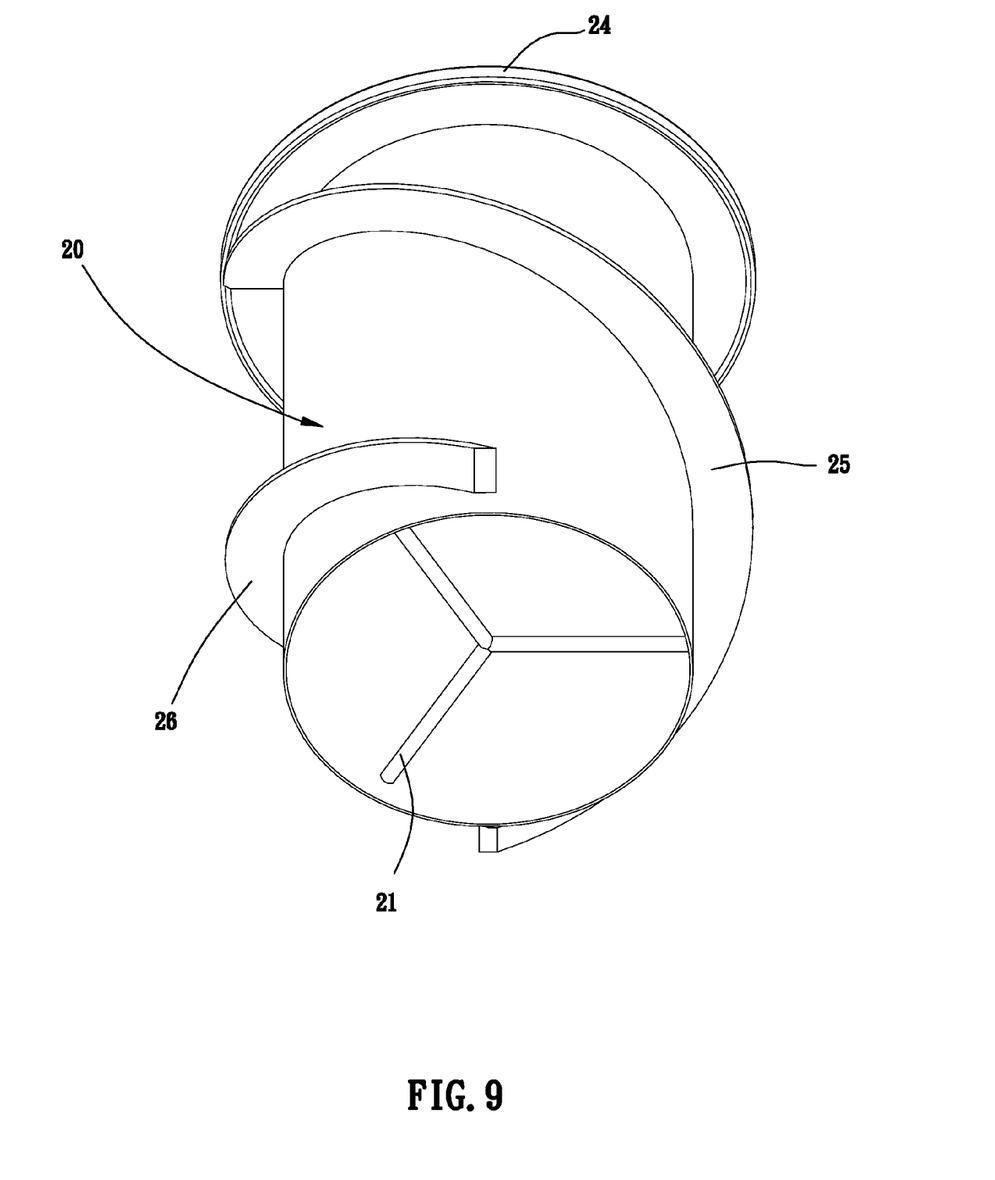
Figure 10:
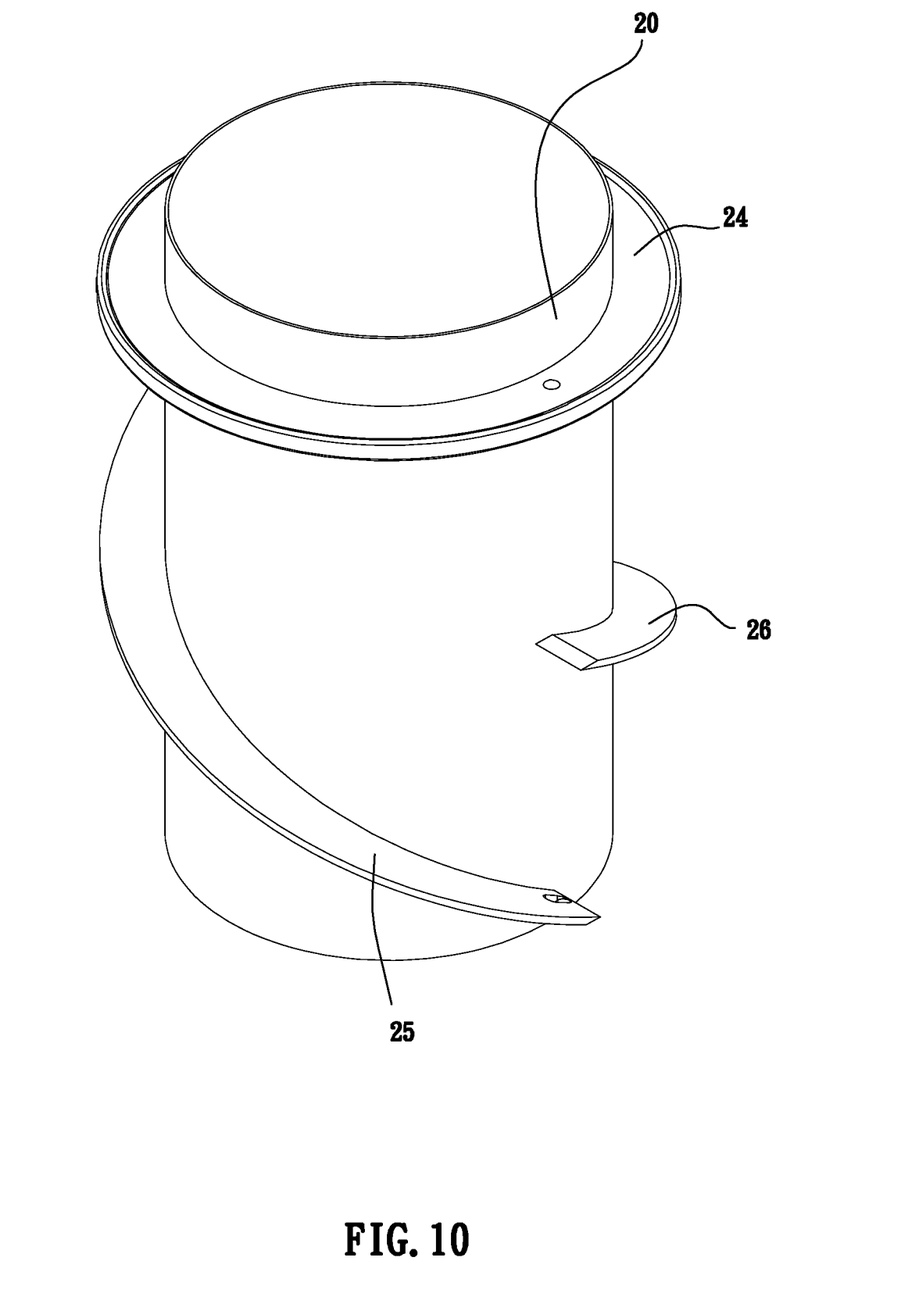
FIG. 10 is a perspective view of an upper guiding plate and a lower guiding plate on the inner pipe of the present invention.
Figure 11:
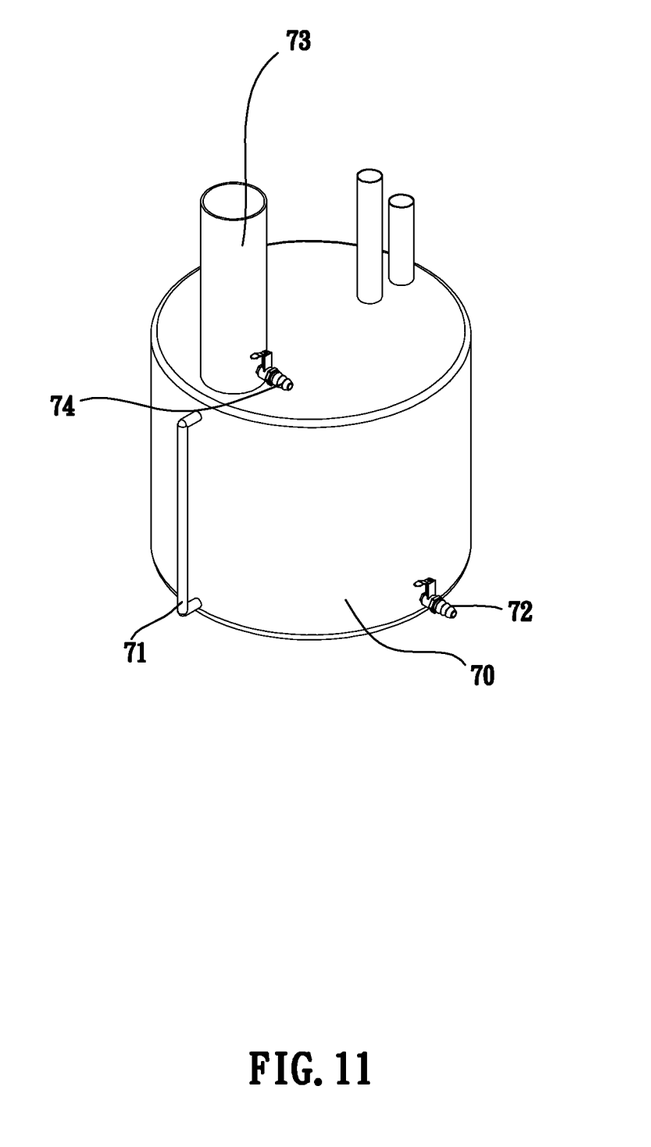
FIG. 11 is a perspective view of the water spray device of the present invention.
Figure 12:
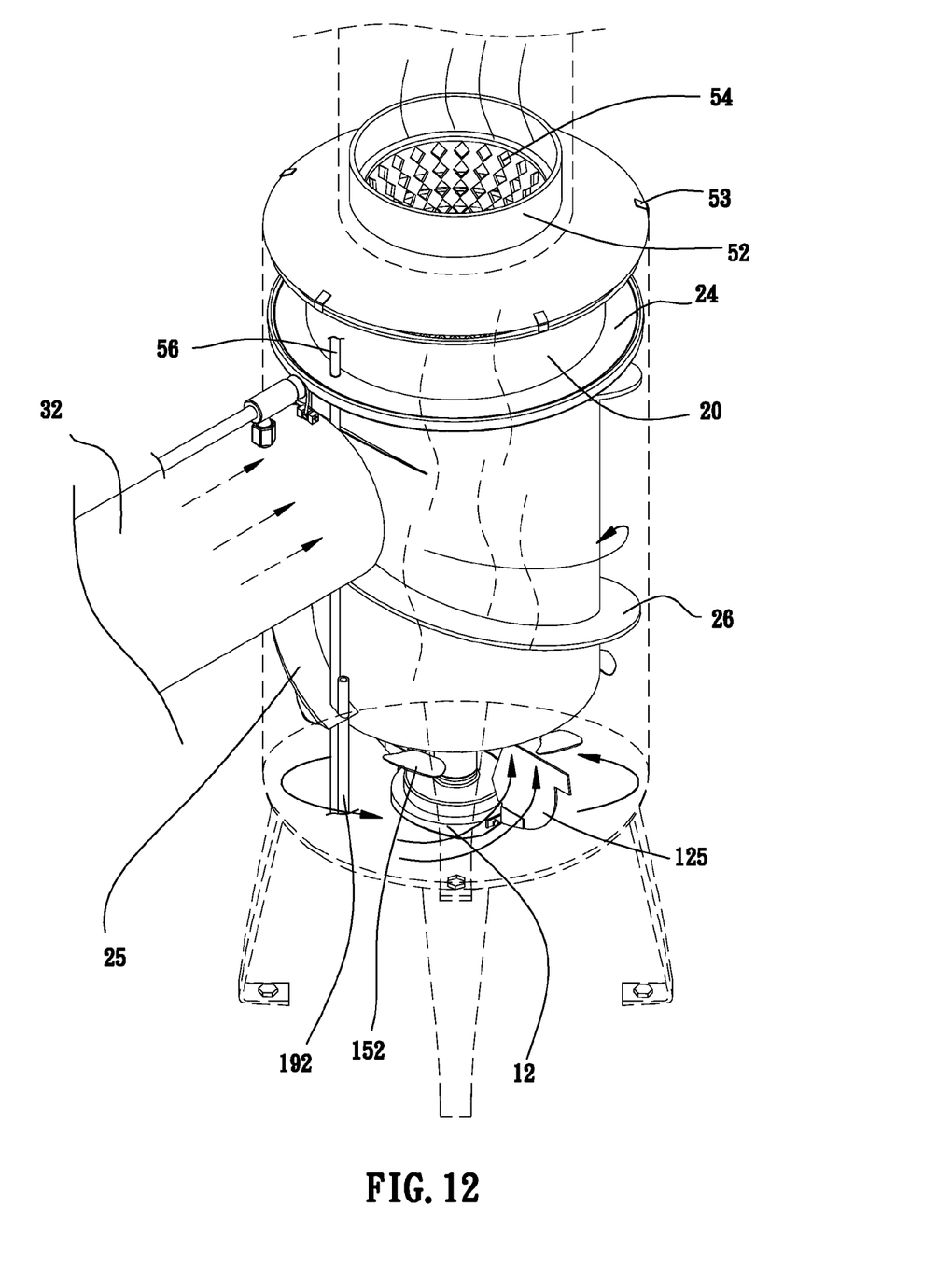
FIG. 12 is an illustration of the flow of air and oil.
Figure 13:
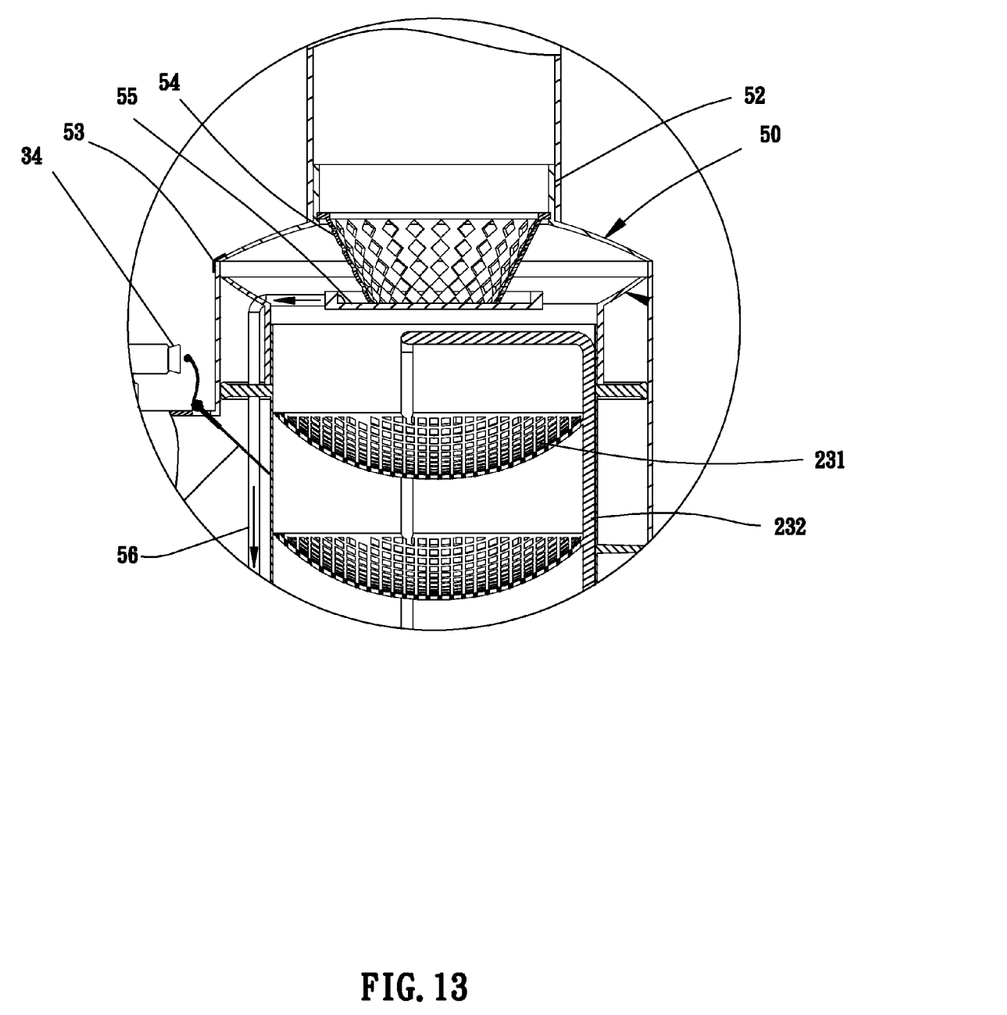
FIG. 13 is an illustration of oil flowing in an oil pipe line of the present invention.

Please refer to FIG. 12 for the operation the present invention. A motor (the motor for extracting air is conventional and therefore is not shown in the drawings) is employed for extracting air and oil mist into the air inlet pipe 32. The air and oil mist will blow and move the actuating plate 37 when passing through the water spray device 30. The actuating plate 37 will actuate the actuating portion 36 to press toward the mist spray elastic switch 34. Then, the mist sprayer 33 will spray mist. At this point, the mist sprayed by the mist sprayer 33 cleanses the actuating plate 37 and the mist will be driven by the wind power of the air inlet pipe 32 to flow inside the outer tank 10, and the mist will be transformed into liquid water. Pressure will be stopped exerted on the actuating plate 37 when the wind power disappears. At this point, the actuating plate 37 will be restored to actuate and causes the actuating portion 36 to stop pressing the mist spray elastic switch 34, and the mist spray elastic switch 34 is automatically restored and stopped to spray mist. The above water outlet structure of the mist spray elastic switch 34 is a conventional automatically restored flushing structure of a pressing type urinal, and therefore will not be described herein. Furthermore, the water source for the mist sprayer 33 can be controlled by the water controlling element 35. The water controlling element 35 can open and close the water source.

When the water, air and oil mist flow from the air inlet pipe 32 toward the outer tank 10, they will be guided by the upper guiding plate 25 and the lower guiding plate 26 to flow to the bottom of the outer tank 10. The water and oil will remain at the bottom of the outer tank 10 and will flow inside the water outlet pipe 19 through the guiding groove portion 123. The air flows downwardly and forms a vortex when passing through the upper guiding plate 25 and the lower guiding plate 26. The vortex flows to the bottom of the outer tank 10 and drives the rotational rods 151 and the air propellers 152 to rotate. The vortex will be stopped by the stopping plate 125 when it passes through the bottom. The vortex will flow upwardly along the guiding grooves 16 and then flow toward the inner pipe 20. Thereby, the vortex flow is produced repeatedly to stir the water and oil at the bottom of the outer tank 10, and a detergent can be further used for purifying the oil.

The stirring of the water and oil will produce stain. The stain caused by ripples will be adhered on screen holes of each of the arc-shaped screens 231. Thereby, the effect of filtering is achieved. The air flowed inside the inner pipe 20 will flow upwardly to the air sleeve 60 and is filtered by the fixed filter screen 61 in the air sleeve 60. The air will then leave the air sleeve 60 upwardly. The air will pass through the circular screen 54 in a path leaving the air sleeve 60 upwardly. The oil in the air will be filtered again by the circular screen 54. The oil will remain on the circular screen 54 and flow slowly downwardly to the supporting portion 55. The oil on the supporting portion 55 will flow along the oil pipe line 56. Please refer to FIG. 13. The oil passes through the bottom of the outer tank 10 and flows to the oil and water separating tank 70 along the oil pipe line 56.

According to the above-mentioned description of the present invention, the water and oil will be settled on the bottom of the outer tank 10. After a long period of time, the oil and the water will be separated to dispose at the top and bottom respectively. The first water outlet switch 191 can be opened for the water to flow out from the water outlet pipe 19 if there is too much water, and therefore the water amount can be reduced. Furthermore, the second water outlet switch 193 can be opened for the water to flow out from the water outlet connection pipe 192 when a water level is higher than the water outlet connection pipe 192, and thereby a water level at the bottom of the outer tank 10 can be lowered.

Furthermore, the water and oil can flow inside the oil and water separating tank 70 through the oil outlet 17 and the water outlet 18 respectively for separation. The water at the bottom of the oil and water separating tank 70 can flow out from the water discharge portion 72 of the oil and water separating tank 70. The oil at the top of the oil and water separating tank 70 can be discharged through the oil discharge portion 74 when a level of the oil reaches a certain height of the oil storage pipe 73.

According to the above-mentioned description, the present invention has two advantages: Firstly, the filter screen assembly 23 of the present invention can carry out multiple filtering and achieve the environmentally-friendly effects. The filter screen assembly 23 can be removed for replacement by holding the connecting rods 232 and therefore the present invention is practical and convenient. Secondly, the air, oil mist and water entered into the present invention pass through the upper guiding plate 25, the lower guiding plate 26 and the air propellers 152, and thereby the vortex flow is produced for purifying the oil. Such an integrative process can enhance the efficiency of exhaust and achieve the environmentally-friendly effects.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. An environmentally-friendly exhaust device, comprising:
   an outer tank,
   a plurality of supporting legs being disposed on a bottom circumference of the outer tank,
   a fixing block being disposed on a central location inside the outer tank,
   an upper connecting hole being disposed on a central location of a top side,
   a lower connecting hole being disposed on a central location of a bottom side, the upper connecting hole and the lower connecting hole being connected,
   a guiding groove portion being disposed on a bottom of the fixing block,
   a stopping plate being disposed on two sides of the fixing block respectively,
   a pivot being disposed in the upper connecting hole of the fixing block,
   a middle section of the pivot being formed with a relatively larger diameter for the pivot to press against inside the upper connecting hole, an axial hole being penetrated through a central location of the pivot,
   an axial rod being disposed in the axial hole,
   a bottom end of the axial rod being formed with a relatively smaller diameter, the bottom end of the axial rod pressing against the lower connecting hole after penetrating through the axial hole, a top end of the axial rod penetrating through the axial hole,
   a locking piece being sleeved on the top end of the axial rod, the locking piece being fixed on a top side of the pivot,
   a plurality of rotational rods being disposed radially on a circumference of the locking piece, an air propeller being disposed on an end portion of each of the rotational rods,
   a plurality of inclined guiding grooves in spiral grooved shape being disposed on the circumference of the locking piece, each of the guiding grooves extending downwardly to a bottom end of the pivot,
   an oil outlet being connected to a lower section of the outer tank, a water outlet being connected to the outer tank below the oil outlet,
   an oil outlet switch being disposed on the oil outlet,
   a water outlet switch being disposed on the water outlet,
   a water outlet pipe being connected to a bottom central location of the outer tank,
   a first water outlet switch being disposed on the water outlet pipe for controlling the water outlet pipe to let out water;
   an inner pipe disposed inside the outer tank,
   a fixing frame being disposed on a bottom end inside the inner pipe, the fixing frame being disposed on the top end of the axial rod for positioning the inner pipe,
   a filter screen assembly being disposed inside the inner pipe and above the fixing frame, the filter screen assembly comprising multiple layers of separated arc-shaped screens,
   a plurality of connecting rods being disposed on an inner circumference of each of the arc-shaped screens for connecting the arc-shaped screens as one body,
   an arc-shaped part of each of the arc-shaped screens facing upwardly or facing downwardly, each of the connecting rods extending upwardly and bending to connect with each other for convenience of holding,
   a circular stopping plate being disposed on an outer circumference of an upper section of the inner pipe,
   a circumference of the circular stopping plate being fixedly connected to an inner circumference of the outer tank,
   an upper guiding plate being connected to a lower edge of the circular stopping plate on the inner pipe, the upper guiding plate being spirally surrounding on the inner pipe and fixedly connected to an inner surface of the outer tank,
   a lower guiding plate being disposed below the upper guiding plate, the lower guiding plate being fixedly connected to the inner surface of the outer tank,
   a compartment being formed between the lower guiding plate and the upper guiding plate for spirally surrounding on the inner pipe,
   a double spiral with a helix intersecting shape being formed by the upper guiding plate and the lower guiding plate;
   a water spray device comprising a tubular portion, an end of the tubular portion being connected to the outer tank and the tubular portion being disposed between the upper guiding plate and the lower guiding plate,
   another end of the tubular portion being connected to an air inlet pipe, the air inlet pipe being used for transporting air and oil mist, the air and oil mist inside the air inlet pipe being guided between the lower guiding plate and the upper guiding plate and flowed downwardly to the bottom of the outer tank,
   a mist sprayer being disposed inside the tubular portion for spraying mist toward the outer tank, the mist sprayer penetrating through the tubular portion upwardly for connecting with a mist spray elastic switch, the mist spray elastic switch being used for controlling the mist sprayer to spray mist, the mist spray elastic switch being connected with a water controlling element for controlling inlet and outlet of a water source,
   an actuating portion being pivotally disposed on an upper circumference of the tubular portion, the actuating portion being disposed between the mist spray elastic switch and the outer tank, the actuating portion being pressed toward the mist spray elastic switch, the actuating portion being connected to an actuating plate disposed inside the tubular portion, the actuating plate being blown and moved by a wind power inside the air inlet pipe for pressing the actuating portion toward the mist spray elastic switch and causing the mist sprayer starting to spray mist, the mist spray elastic switch being automatically restored and stopped to spray mist after the wind power disappearing;
   a lower cover comprising a lower body with a concave arc-shaped top, a lower sleeve portion being disposed on a central location of a bottom of the lower body, the lower sleeve portion being sleeved on the outer circumference of the inner pipe;
   an upper cover comprising an upper body with a concave arc-shaped bottom,
   an upper sleeve portion being disposed at a central location of a top of the upper body, a circumference of the upper body being connected to a top end edge of the outer tank;
   an oil and water separating tank connected to the oil outlet and the water outlet,
   a water discharge portion being disposed on a lower section of the oil and water separating tank,
   an oil storage pipe being connected on the oil and water separating tank, and an oil discharge portion being disposed on the oil storage pipe.

2. The environmentally-friendly exhaust device as claimed in claim 1, wherein the fixing block is in a reducing staircase shape from bottom to top.

3. The environmentally-friendly exhaust device as claimed in claim 1, wherein the plurality of the supporting legs comprises three and the plurality of the supporting legs being disposed evenly on the bottom circumference of the outer tank.

4. The environmentally-friendly exhaust device as claimed in claim 1, wherein the bottom the outer tank is formed in an arc shape with a convex side facing downwardly, said bottom having a plurality of concave positioning portions is disposed thereon, a plurality of convex fixing portions is disposed on the bottom of the fixing block for positioning the concave positioning portions.

5. The environmentally-friendly exhaust device as claimed in claim 1, wherein: the rotational rods comprise six rotational rods.

6. The environmentally-friendly exhaust device as claimed in claim 1, wherein a screwing element is disposed on the bottom end of the axial rod.

7. The environmentally-friendly exhaust device as claimed in claim 1, wherein the guiding grooves comprise three guiding grooves.

8. The environmentally-friendly exhaust device as claimed in claim 1, wherein a connection pipe is connected on a side of the oil and water separating tank, said connection pipe indicating a height of oil and water of the oil and water separating tank.

9. The environmentally-friendly exhaust device as claimed in claim 1, wherein the oil storage pipe is transparent.

10. The environmentally-friendly exhaust device as claimed in claim 1, wherein the actuating plate is in a semilunar shape.

11. The environmentally-friendly exhaust device as claimed in claim 1, wherein the water outlet pipe extends externally, a water outlet connection pipe penetrating upwardly into the bottom of the outer tank is disposed on the extension portion of the water outlet pipe, the water outlet connection pipe is controlled to let out water by a second water outlet switch.

12. The environmentally-friendly exhaust device as claimed in claim 1, wherein the fixing frame being disposed on a plurality of fixing rods at the central location of the inner pipe and is connected to an inner surface of the inner pipe.

13. The environmentally-friendly exhaust device as claimed in claim 1, wherein the arc-shaped screens comprise four arc-shaped screens.

14. The environmentally-friendly exhaust device as claimed in claim 1, wherein the environmentally-friendly exhaust device further comprises an air sleeve, the air sleeve is disposed on an outer circumference of the upper sleeve portion of the upper cover, a fixed filter screen is disposed inside the air sleeve.

15. The environmentally-friendly exhaust device as claimed in claim 1, wherein the connecting rods comprise three connecting rods.

16. The environmentally-friendly exhaust device as claimed in claim 1, wherein a transparent portion is disposed on an outer surface of the outer tank.

17. The environmentally-friendly exhaust device as claimed in claim 16, wherein the transparent portion comprises a lens, an upper part of the lens is in an arc shape and a lower part of the lens is straight.

18. The environmentally-friendly exhaust device as claimed in claim 1, wherein a plurality of engaging elements is disposed on the circumference of the upper body, each of the engaging elements is engaged on the outer tank for positioning.

19. The environmentally-friendly exhaust device as claimed in claim 1, wherein a circular screen is downwardly disposed on an inner circumference of the upper sleeve portion, a supporting portion is installed on a bottom of the circular screen, an oil pipe line is disposed on a side of the supporting portion, the oil pipe line extends between the outer tank and the inner pipe and penetrates downwardly through the lower body of the lower cover and the bottom of the outer tank, the oil pipe line is connected to the oil and water separating tank.

20. The environmentally-friendly exhaust device as claimed in claim 1, wherein a fixing element is penetrated through a bottom of each of the supporting legs for fixing the supporting legs on a plane, wherein the fixing element comprises a screw.

* * * * *